(12) United States Patent
Suzuki

(10) Patent No.: US 7,239,947 B2
(45) Date of Patent: Jul. 3, 2007

(54) OPERATION EQUIPMENT FOR VEHICLE

(75) Inventor: Isamu Suzuki, Kariya (JP)

(73) Assignee: DENSO Corporation, Kariya (JP)

( * ) Notice: Subject to any disclaimer, the term of this patent is extended or adjusted under 35 U.S.C. 154(b) by 134 days.

(21) Appl. No.: 10/771,792

(22) Filed: Feb. 9, 2004

(65) Prior Publication Data

US 2004/0158374 A1    Aug. 12, 2004

(30) Foreign Application Priority Data

Feb. 10, 2003    (JP)    ............................. 2003-032823

(51) Int. Cl.
*G01C 21/26*    (2006.01)
(52) U.S. Cl. ........................................................ 701/36
(58) Field of Classification Search ................. 701/36; 345/104

See application file for complete search history.

(56) References Cited

U.S. PATENT DOCUMENTS 5,847,690 A *  12/1998  Boie et al. .................. 345/104
2003/0132922 A1*  7/2003  Philipp ........................ 345/173
2004/0056758 A1*  3/2004  Schwartz .................... 340/5.2

FOREIGN PATENT DOCUMENTS

| JP | A-07-103778 | 4/1995 |
| JP | A-H09-292261 | 11/1997 |
| JP | A-H11-312053 | 11/1999 |
| JP | A-2000-020229 | 1/2000 |
| JP | A-2000-329577 | 11/2000 |

OTHER PUBLICATIONS

Notice of Reason for Refusal from Japanese Patent Office issued on Oct. 31, 2006 for the corresponding Japanese patent application No. 2003-032823 (a copy and English translation thereof).

* cited by examiner

*Primary Examiner*—Thu V. Nguyen
(74) *Attorney, Agent, or Firm*—Posz Law Group, PLC

(57) ABSTRACT

Operation equipment for a vehicle includes a display having a touch switch with a touch sensor for detecting an operation of a passenger or a driver of the vehicle; an electronic control unit; and a driving sensor for detecting the vehicle moving or stopping. The display displays the touch switch corresponding to a predetermined function. The electronic control unit determines that the predetermined function is allowed to perform when the driving sensor detects the vehicle stopping. The electronic control unit determines that the predetermined function is allowed to perform when the touch sensor detects the operation of the passenger.

22 Claims, 2 Drawing Sheets

OPERATION EQUIPMENT FOR VEHICLE

CROSS REFERENCE TO RELATED APPLICATION

This application is based on Japanese Patent Application No. 2003-32823 filed on Feb. 10, 2003, the disclosure of which is incorporated herein by reference.

FIELD OF THE INVENTION

The present invention relates to operation equipment for a vehicle. Specifically, the operation equipment includes multiple operations, and performs one of the operations in accordance with a passenger's or a driver's selection.

BACKGROUND OF THE INVENTION

Operation equipment mounted on a vehicle is suitably used for a vehicle navigation system. The vehicle navigation system displays a map of geography around the vehicle, calculates a route from a present position of the vehicle to a destination, and guides in accordance with the route. The navigation system includes a display having a touch switch for operating various operations such as a setting of the destination, a starting operation of guidance, a scrolling operation of the map, and a changing operation of a scale of the map.

The navigation system is disposed in an instrument panel between a driver seat and a passenger seat so that both of a driver and a passenger can operate the navigation system easily and view the display of the navigation system easily. Further, while the vehicle is moving, the passenger or the driver cannot operate the touch switch except for a certain switch because of a safety. Here, the certain switch provides minimum operations in the navigation system, for example, the changing operation of the scale of the map and the like.

The driver is required to concentrate on driving the vehicle. Therefore, it is preferred that the driver cannot operate any switch in the navigation system. However, the navigation system according to a prior art uniformly prohibits both of the driver and the passenger from operating the touch switch. Therefore, the passenger, who does not drive the vehicle, cannot operate the switch.

In view of the above problem, a vehicle navigation system is disclosed in Japanese Unexamined Patent Application Publication No. H09-292261. This navigation system includes a sensor having a generator and a receiver. The generator generates and emits a supersonic wave, and the receiver receives the supersonic wave. The generator and the receiver are disposed on a driver's side of a front panel in a passenger compartment of the vehicle. The front panel includes a display of the navigation system. While the vehicle is moving, the generator emits the supersonic wave. Then, the receiver receives a reflection of the supersonic wave. When a hand or an arm of the driver crosses the supersonic wave emitted from the generator, the receiver receives the reflection of the supersonic wave reflected by the hand or the arm of the driver, so that the sensor detects the driver's hand or arm. Then, the navigation system prohibits some predetermined operations, which are operated with a touch switch of a display or a panel switch disposed around the display. On the other hand, when the touch switch or the panel switch is operated without detecting the driver's hand or arm, the navigation system determines the switch is operated by the passenger, so that the navigation system allows all operations, which are operated with the touch switch and the panel switch.

However, an outside sensor such as the generator and the receiver is necessitated in the navigation system to detect the driver's hand or arm. Therefore, a manufacturing cost of the navigation system is increased. Further, the dimensions of the navigation system become large, since the outside sensor is required to be disposed on the front panel separately.

SUMMARY OF THE INVENTION

In view of the above problem, it is an object of the present invention to provide operation equipment. Specifically, the operation equipment without any outside sensor is capable of determining a driver's operation and a passenger's operation.

Operation equipment for a vehicle includes a display having a touch switch with a touch sensor for detecting an operation of a passenger or a driver of the vehicle; an electronic control unit; and a driving sensor for detecting the vehicle moving or stopping. The display displays the touch switch corresponding to a predetermined function. The electronic control unit determines that the predetermined function is allowed to perform when the driving sensor detects the vehicle stopping. The electronic control unit determines that the predetermined function is allowed to perform when the touch sensor detects the operation of the passenger.

The above operation equipment without any outside sensor is capable of determining the driver's operation and the passenger's operation. When the vehicle is stopping, all switch operations performed by the passenger or the driver with the touch switch are allowed to perform. Even when the vehicle is moving, all switch operations performed by the passenger with the touch switch are allowed to perform.

Preferably, the display further includes a plurality of touch switches, which correspond to predetermined functions, respectively. The electronic control unit determines that part of the predetermined functions is prohibited to perform when the touch sensor detects the operation of the driver and the driving sensor detects the vehicle moving. In the above equipment, while the vehicle is moving, predetermined some switch operations performed by the driver with the touch switch are prohibited to perform, and the other switch operations performed by the driver with the touch switch are allowed to perform.

Preferably, the touch sensor detects an approach position of a hand or a finger when the driver or the passenger moves the hand or the finger closer to the display. The touch sensor detects a touch position of a finger when the driver or the passenger touches the display. More preferably, the electronic control unit distinguishes the touch position from the approach position, and distinguishes the approach position of the hand from the approach position of the finger on the basis of a signal from the touch sensor. Furthermore preferably, the vehicle is a right hand drive vehicle, and the touch switch is disposed on a right side of the display. The display is disposed between a passenger seat and a driver seat of the vehicle. The electronic control unit determines the operation of the passenger when the touch sensor detects the approach position of the hand.

Preferably, the touch sensor includes a thin film and a plurality of current supplies. The thin film is capable of forming a capacitor having a capacitance between the thin film and the hand or the finger in a case where the hand or the finger moves closer to the display or touches the display. The current supplies supply currents to the thin film. The touch sensor detects the approach position and the touch position on the basis of the capacitance of the capacitor calculated by the currents.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Operation equipment for a vehicle according to a preferred embodiment of the present invention is described as follows. The equipment is suitably used for a vehicle navigation system. Here, the vehicle is a right hand drive vehicle. Although the equipment is used for the vehicle navigation system, the equipment can be used for other systems mounted on the vehicle.

Figure 1:
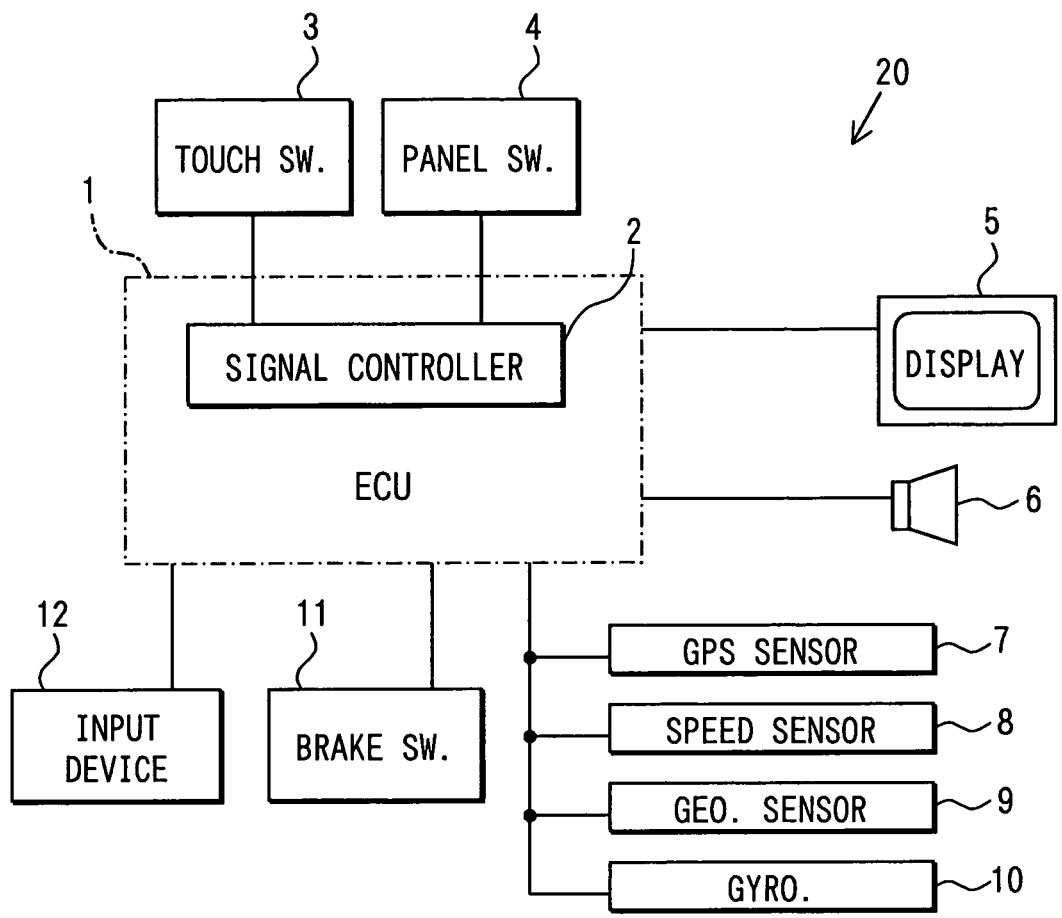
FIG. 1 is a schematic diagram showing a vehicle navigation system according to a preferred embodiment of the present invention.

As shown in FIG. 1, the vehicle navigation system 20 includes multiple detectors for detecting a vehicle location (i.e., the present position of the vehicle) such as a GPS receiver 7, a vehicle speed sensor 8, a geomagnetic sensor 9, and a gyroscope 10. The navigation system 20 further includes a touch switch 3, a panel switch 4, a parking brake switch 11 and an input device 12 for inputting a map data. These switches 3, 4, 11 and device 12 together with the detectors 7–10 are connected to a navigation ECU (i.e., a navigation electronic control unit) 1. A display 5 and a speaker 6 are also connected to the navigation ECU 1 so as to display a map and the like and to inform by a sound or a speech.

Here, the GPS receiver 7 receives a signal from the global positioning system (i.e., GPS) so that a position of the vehicle is detected on the basis of a detected electric wave sent by a satellite of the GPS. The vehicle speed sensor 8 detects a moving speed of the vehicle. Each data detected by the sensor 7–10 includes a different error, which has a different property. Therefore, the multiple detectors, i.e., the sensors 7–10 compensate one another so that the present position of the vehicle is detected more correctly. Although the detectors are composed of the sensors 7–10, the detectors can be composed of part of the sensors in a case where the sensor 7–10 has high accuracy. Further, a rotation sensor for detecting a rotation of a steering while of the vehicle and/or a yaw rate sensor for detecting a yaw of a body of the vehicle can be used for the detectors instead of the gyroscope 10.

The display 5 is, for example, provided by a liquid-crystal display. A screen of the display 5 displays a symbol of the vehicle for indicating the present position of the vehicle calculated on the basis of data from detectors 7–10, and the map inputted through the input device 12. Further in a case where a destination is inputted by a driver or a passenger of the vehicle, the screen of the display 5 displays a guide route from the present position of the vehicle to the destination. Furthermore, the screen of the display 5 displays multiple operation items for providing the touch switch 3. The multiple operation items correspond to various functions of the navigation system 20, for example, one of the operation items corresponds to a changing operation for changing the map on the display 5. These operation items, functions or the display 5 are controlled with the ECU 1.

Figure 2:
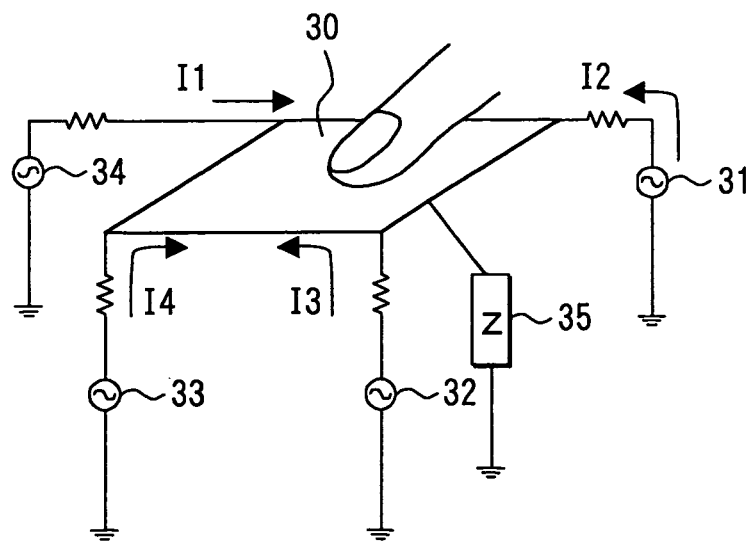
FIG. 2 is a schematic view explaining a detecting principle of a touch sensor, according to the preferred embodiment.

When the screen of the display 5 displays the operation items, an operator such as the driver or the passenger touches one of the operation items displayed on the screen so that the touch switch 3 corresponding to the operation item is selected. Here, a touch sensor (not shown) is disposed on the screen of the display 5. The touch sensor detects a touch position of the operator on the screen so that the ECU 1 recognizes the operation item, i.e., the touch switch 3. The touch position touched by the operator corresponds to the operation item. As shown in FIG. 2, the touch sensor is composed of a thin film 30 and four alternating current voltage supplies (i.e., AC voltage supplies) 31–34. The thin film 30 is applied on the screen of the display 5, so that all of the screen is covered with the thin film 30. A capacitor 35 having a capacitance Z is formed between the thin film 30 and a hand, or a finger of the operator, which moves closer to the screen or touches the screen. Each AC voltage supply 31–34 energizes an alternating current voltage (i.e., AC voltage) from a corner of the thin film 30.

A detecting principle of the touch sensor for detecting the touch position is described as follows. Each AC voltage supply 31–34 applies the same AC voltage at the corner of the thin film 30. In a case where the capacitor 35 is not formed between the thin film 30 and the hand or the finger of the operator, an alternating current does not flow though the thin film 30. On the other hand, when the operator touches the screen of the display 5 or moves the finger or the hand closer to the screen so that the operator operates one of the operation items displayed on the screen, the capacitor 35 is formed between the finger or the hand and the screen, i.e., the thin film 30. At that time, each AC voltage supply 31–34 supplies an alternating current I1–I4 to the thin film 30, respectively. Each alternating current I1–I4 corresponds to a resistance of the thin film 30 between the AC voltage supply 31–34 and the touch position on the thin film 30. Therefore, on the basis of the alternating current I1–I4, the touch position of the finger is calculated and detected.

Further, when the hand or the finger is moving closer to the screen and does not touch the screen yet, the capacitor 35 is also formed between the hand or the finger and the thin film 30. In this case, the currents I1–I4 are smaller than the currents I1–I4 in a case where the hand or the finger touches the screen. However, the touch sensor can detect the hand or the finger moving closer to the screen by measuring each alternating current I1–I4, so that the closest approach position of the hand or the finger is detected. The closest approach position is an approach position, where a distance between the finger or the hand and the screen becomes shortest. Furthermore, the switch signal controller can distinguish the hand from the finger, since the currents I1–I4 Z in a case where the hand is moving closer to the screen are larger than those in a case where the finger is moving closer to the screen. Thus, the switch signal controller 2 distinguishes among the touch of the finger, the approach of the finger, and the approach of the hand on the basis of the alternating currents I1–I4.

Further, the panel switch 4 is arranged around the screen of the display 5. The panel switch 4 performs various operations, which is similar to the performance of the touch switch 3. Therefore, the panel switch 4 corresponds to another operation item, which is different from the operation item corresponding to the touch switch 3. The operation item of the panel switch 4 may be the same as the operation item of the touch switch 3.

The speaker 6 is used for an output of a sound or a speech, which provides audio assist or various beeps. For example, the speaker 6 may be a speaker mounted on the vehicle separately, or a speaker mounted in the navigation system.

The parking brake switch 11 turns on in a case where a parking brake of the vehicle is applied, and turns off in a case where the parking brake is released. In this embodiment, the ECU 1 determines on the basis of a signal from the parking brake switch 11 whether the vehicle is moving or stopping. Although the ECU 1 determines the vehicle moving or stopping on the basis of the signal from the parking brake switch 11, the ECU 1 can determine on the basis of a signal from the vehicle speed sensor 8.

The input device 12 is used for inputting various map data such as a road data and a landmark data into the ECU 1. The input device 12 includes a memory for memorizing the various map data. Here, the memory is, in general, CD-ROM (i.e., compact disk read only memory) or DVD-ROM (i.e., digital versatile disc-read only memory). That is because the various map data are large amounts so that it is required to have a large capacity of memory. The CD-ROM or the DVD-ROM has a large capacity of memory so that they are used for the memory. Although the memory is the CD-ROM or the DVD-ROM, the memory may be a memory card or a hard disk.

The ECU 1 is provided by a well-known computer, which includes a CPU (i.e., central processing unit), a ROM (i.e., read only memory), a RAM (i.e., random access memory), an input/output circuit and a bus line for connecting them. A predetermined program is memorized in the ROM so that the navigation system 20 is operated according to the program. Specifically, the CPU performs a predetermined computation in accordance with the program.

In the ECU 1, a switch signal controller 2 is disposed. A switch operation signal outputted from the touch switch 3 or the panel switch 4 is inputted into the switch signal controller 2, so that the switch signal controller 2 generates and outputs a control signal corresponding to the switch operation signal. The switch operation signal corresponds to the operation item selected by the operator. Further, the switch signal controller 2 generates a warning signal, which informs that the operation item is prohibited to perform.

The navigation system 20 is, for example, disposed on an instrument panel between a passenger seat and a driver seat, so that the driver and the passenger can operates the touch switch 3 and the panel switch 4 easily.

Figure 3:
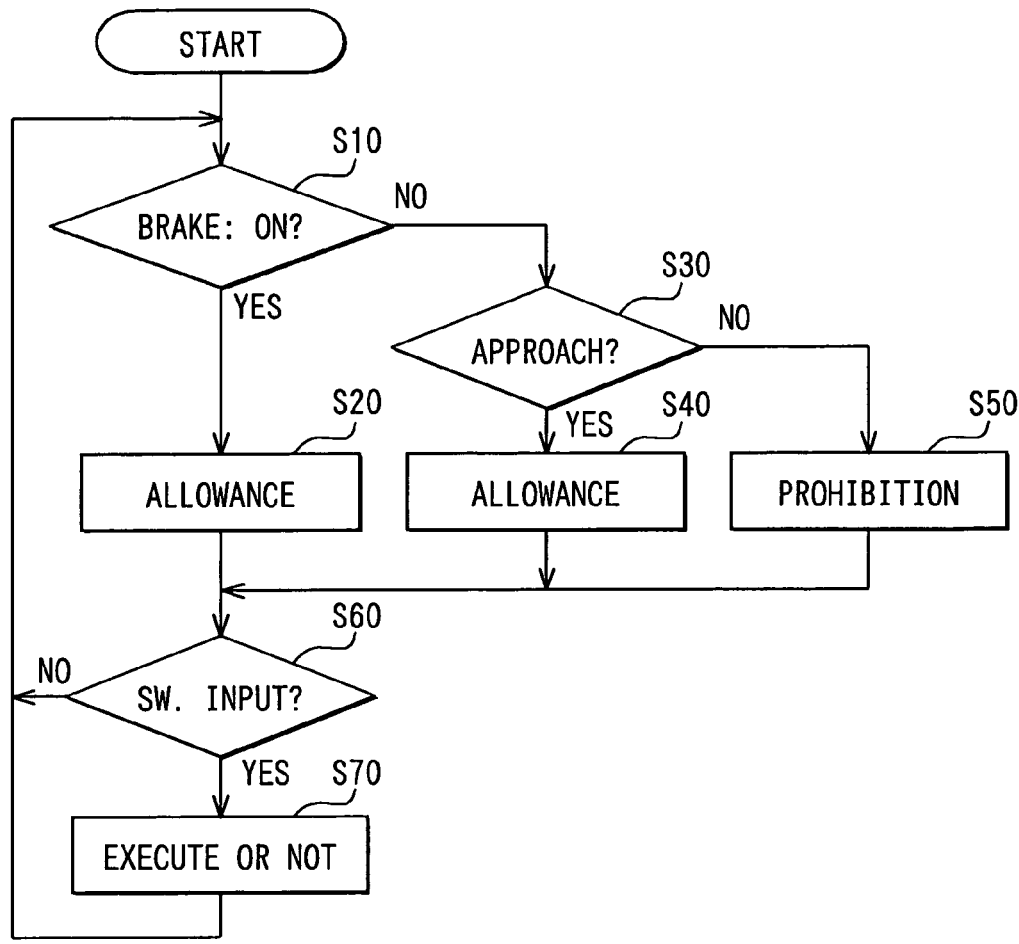
FIG. 3 is a flow chart explaining an operation of a switch signal controller, according to the preferred embodiment.

The switch signal controller 2 in the ECU 1 performs a process (i.e., a computation) shown in FIG. 3. In Step S10 in FIG. 3, the switch signal controller 2 determines whether the parking brake is applied or released on the basis of the signal from the parking brake switch 11. When the switch signal controller 2 determines that the parking brake is applied, i.e., the vehicle is stopping, the switch signal controller 2 is set to be an allowance state, as shown in Step S20 in FIG. 3. Here, when the switch signal controller 2 becomes the allowance state, all of the operation items (i.e., all of switch operations) inputted from the touch switch 3 and the panel switch 4 into the switch signal controller 2 is allowed to input into the ECU 1 so that the ECU 1 performs an operation corresponding to the operation item, i.e., the switch operation. When the switch signal controller 2 determines that the parking brake is released, i.e., the vehicle is moving, the switch signal controller 2 is set to be a prohibition state, and then it goes to Step S30. Here, when the switch signal controller 2 becomes the prohibition state, some of predetermined switch operations of the touch switch 3 and the panel switch 4 are allowed to input into the ECU 1, and the other switch operations are prohibited to input. Specifically, operations (i.e., functions of the navigation system 20) corresponding to the other switch operations are prohibited from performing.

In Step S30, the switch signal controller 2 determines whether the hand of the operator moves closer to the screen of the display 5 or not on the basis of the signal from the touch sensor disposed on the screen. Specifically, when the operator moves the hand closer to the screen, i.e., the touch sensor on the screen, the capacitor 35 is formed between the hand of the operator and the thin film 30. This capacitor 35 has a small capacitance Z because the hand does not touch the screen yet. On the basis of the alternating current I1–I4 flowing from the AC voltage supplies 31–34 to the thin film 30, the closest approach position of the hand is calculated and detected.

Figure 4:
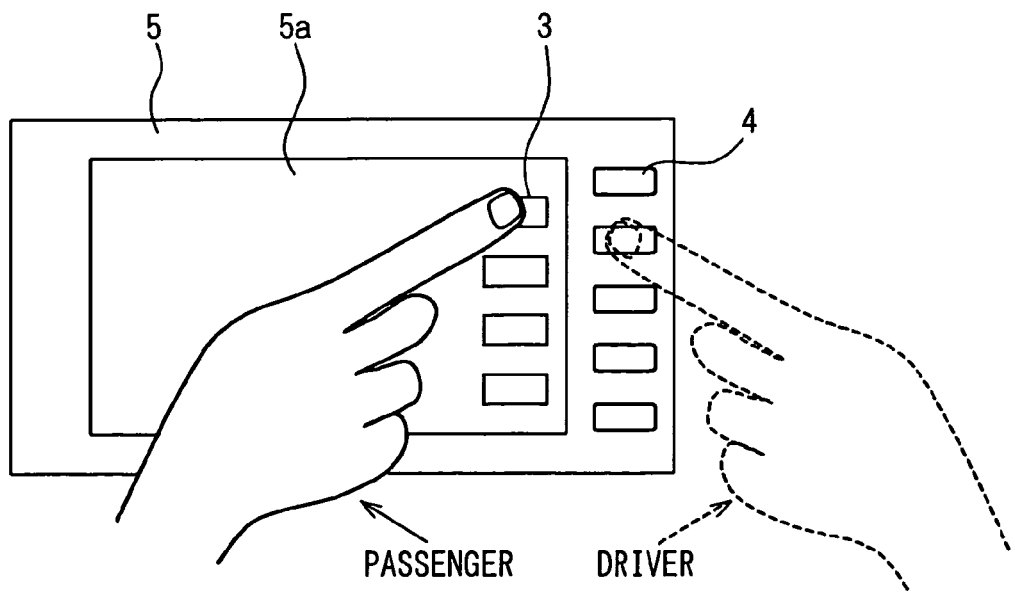
FIG. 4 is a plan view showing a touch switch and a panel switch, according to the preferred embodiment.

Here, as shown in FIG. 4, the screen 5*a* of the display 5 displays the operation items incorporated with the touch switch 3 on the driver's side of the screen 5*a*, i.e., on the right side of the screen 5*a*. Further, the panel switch 4 is also disposed on the front panel on the driver's side, i.e., on the right side of the display 5. Here, the vehicle is a right hand drive vehicle. Therefore, a driver seat is disposed on the right side of the vehicle, and a passenger seat is disposed on the left side of the vehicle. In FIG. 4, the hand, which is drawn in a solid line, is the right hand of the passenger, and the hand, which is drawn in a dotted line, is the left hand of the driver. Therefore, in a case where the passenger sitting on the passenger seat operates the touch switch 3 or the panel switch 4, the hand of the operator, i.e., the hand of the passenger moves closer to the screen 5*a* of the display 5. Then, the touch sensor detects the hand of the passenger moving closer to the screen 5*a*, so that the switch signal controller 2 determines that the passenger operates the touch switch 3 or the panel switch 4. On the other hand, when the finger of the operator moves closer to the screen 5*a*, the touch sensor detects the finger so that the switch signal controller 2 determines the finger of the driver moves closer to the screen 5*a*. Thus, the touch sensor can distinguish an operation of the passenger from an operation of the driver.

Although the vehicle is the right hand drive vehicle, the navigation system 20 can be mounted on a left hand drive vehicle. In this case, the driver seat is disposed on the left side of the vehicle, and the passenger seat is disposed on the right side of the vehicle. Therefore, when the switches 3, 4 are disposed on the right side of the display 5, the hand drawn in the solid line in FIG. 4 is the right hand of the driver, and the hand drawn in the dotted line is the left hand of the passenger. Therefore, when the touch sensor detects the hand, the switch signal controller 2 determines the hand of the driver moves closer to the screen 5*a*. When the touch sensor detects the finger, the switch signal controller 2 determines the finger of the passenger moves closer to the screen 5*a*. Thus, the touch sensor can distinguish the operation of the passenger from the operation of the driver.

In Step S30, when the touch sensor detects the hand of the operator moving closer to the screen, the switch signal controller 2 determines that the passenger operates the switch 3, 4. Then, it goes to Step S40, and the switch signal controller 2 is set to be the allowance state.

On the other hand, when the touch sensor does not detect the hand of the operator, the switch signal controller 2 determines that the passenger does not operate the switch 3, 4. Then, it goes to Step S50, and the switch signal controller 2 is set to be the prohibition state. Therefore, predetermined some switch operations of the touch switch 3 and panel switch 4 are prohibited to input into the ECU 1. Further, if the switch signal controller 2 has been in the allowance state, the switch signal controller 2 is changed to be the prohibition state. Here, when the parking brake is released, the switch signal controller 2 is set to be the prohibition state as an initial state. After that, the switch signal controller 2 maintains the initial state, i.e., the prohibition state, unless the switch signal controller 2 determines that the hand of the operator moves closer to the screen 5a of the display 5.

In Step S60, when the switch signal controller 2 determines that the switch operation of the touch switch 3 and/or the panel switch 4 is performed, it goes to Step S70. When the switch signal controller 2 does not determine the performance of the switch operation, it returns and goes to Step S10. Here, when the operator touches the screen 5a so as to input one of the operation items, the currents I1–I4 flowing from the AC voltage supplies 31–34 become larger than those in a case where the hand or the finger of the operator moves closer to the screen 5a and the hand or the finger does not contact with the screen 5a. Therefore, each of the alternating currents I1–I4 flowing from the AC voltage supplies 31–34 to the thin film 30 also increases. Thus, on the basis of the alternating current I1–I4, the switch signal controller 2 distinguishes an approach state from a touch state. The approach state is that the hand or the finger of the operator moves closer to the screen 5a of the display 5, and the hand or the finger does not touch the screen 5a. The touch state is that the hand or the finger of the operator contacts the screen 5a, i.e., touches the screen 5a. Specifically, when the alternating currents I1–I4 become larger than predetermined currents, the switch signal controller 2 distinguishes the touch state from the approach state. In addition to a condition whether the alternating currents I1–I4 become larger than the predetermined currents, in a case where duration (i.e., maintaining time) of the alternating currents exceeding the predetermined currents becomes longer than a predetermined time, the switch signal controller 2 may determine the touch state from the approach state. In this case, a determination error of the touch state is reduced.

In Step S70, the switch signal controller 2 works in accordance with the allowance state or the prohibition state, which is set in Steps S20, S40, and S50. Specifically, when the switch signal controller 2 is in the allowance state, all of the switch operation inputted from the touch switch 3 and the panel switch 4 are allowed to input into the ECU 1. Then, the ECU 1 generates a control signal for performing the operation according to the switch operation inputted from the touch switch 3 or the panel switch 4, so that the operation is performed (i.e., executed). On the other hand, when the switch signal controller 2 is in the prohibition state, and the switch operation prohibited to input into the ECU 1 is performed, the warning signal about the prohibition of the switch operation because the vehicle is moving is sent to the display 5 and the speaker 6. Then, the display 5 displays the warning signal, and the speaker 6 generates a warning sound such as a beep. However, when the switch signal controller 2 is in the prohibition state, and the switch operation allowed to input into the ECU 1 is performed, the ECU 1 generates a control signal for performing the operation according to the switch operation inputted from the touch switch 3 or the panel switch 4, so that the operation is performed (i.e., executed).

Thus, the navigation system 20 without any outside sensor is capable of determining the driver's operation and the passenger's operation. While the vehicle is moving, predetermined some switch operations performed by the driver with the touch switch 3 or the panel switch 4 are prohibited to perform, and all switch operations performed by the passenger with the touch switch 3 or the panel switch 4 are allowed to perform.

(Modifications)

Although the touch switch 3 is disposed on the driver's side in the screen 5a of the display 5, and the panel switch 4 is also disposed on the driver's side of the front panel, the touch switch 3 and/or the panel switch 4 can be disposed on other positions. For example, the touch switch 3 can be disposed on the passenger's side (i.e., on the left side) in the screen 5a of the display 5, and the panel switch 4 can be also disposed on the passenger's side of the front panel. In this case, when the driver operates the touch switch 3 or the panel switch 4, the hand of the driver moves closer to the screen 5a of the display 5. Therefore, the hand of the passenger does not move closer to the screen 5a, in a case where the passenger operates the touch switch 3 or the panel switch 4. The switch signal controller 2 determines the driver's operation when the touch sensor detects the hand of the operator moving closer to the screen 5a. Thus, the switch signal controller 2 can distinguish the driver's operation and the passenger's operation.

In the above case, the vehicle is the right hand drive vehicle. However, even if the navigation system 20, of which the switches 3, 4 are disposed on the left side of the display 5, is mounted on the left hand drive vehicle, the switch signal controller 2 can distinguish the driver's operation and the passenger's operation. In this case, when the touch sensor detects the hand, the switch signal controller 2 determines the hand of the passenger moves closer to the screen 5a. When the touch sensor detects the finger, the switch signal controller 2 determines the finger of the driver moves closer to the screen 5a.

Further, the touch switch 3 and the panel switch 4 can be disposed on an upper side or a lower side of the display 5 in accordance with a position of the display 5 in the front panel. For example, when the display 5 is disposed on the comparatively lower side, the switches 3, 4 can be disposed on the lower side of the display 5. When the display 5 is disposed on the comparatively upper side, the switches 3, 4 can be disposed on the upper side of the display 5. In this case, when the operator operates the switch 3, 4, the hand of the operator always moves closer to the screen 5a. Therefore, the switch signal controller 2 can determine the passenger's operation and the driver's operation on the basis of the approach position of the hand.

Although the touch sensor distinguishes the operation of the passenger by detecting the hand of the operator, the touch sensor can distinguish the operation of the passenger by other methods. For example, when the touch sensor detects the approach position of the hand or the finger, which moves from the left side to the right side of the screen 5a, the touch sensor determines the hand or the finger of the passenger moving closer to the screen 5a. When the touch sensor detects the approach position of the hand or the finger, which moves from the right side to the left side of the screen 5a, the touch sensor determines the hand or the finger of the driver moving closer to the screen 5a. Further, the touch sensor can detect both of the approach position and the touch position simultaneously, so that the ECU 1 determines the operation of the passenger when the touch sensor simultaneously detects both of the approach position and the touch position. Specifically, the ECU 1 determines the operation of the passenger when the touch sensor simultaneously detects both of the approach position of the hand and the touch position. Furthermore, when the touch sensor detects the hand with the finger instead of the finger only, the touch sensor determines the hand with the finger of the passenger moving closer to the screen, as shown in FIG. 4.

Furthermore, the touch sensor may distinguish the operation of the passenger easily by changing an arrangement of the touch switch 3 and/or the panel switch 4. Thus, the touch sensor can distinguish the operation of the passenger from the operation of the driver.

Although the thin film 30 provides the touch sensor, other devices can be used for the touch sensor as long as the sensor detects the approach position and the touch position of the hand or the finger of the operator. For example, multiple photo acceptance devices and light emitting devices are arranged on a transparent substrate such as a glass, so that the light emitting devices emit lights in a direction perpendicular to the substrate, and then the photo acceptance devices detect reflected lights. Thus, the photo acceptance devices and the light emitting devices provide the touch sensor.

Such changes and modifications are to be understood as being within the scope of the present invention as defined by the appended claims.

What is claimed is:

1. Operation equipment for a vehicle comprising:
   a display having a touch switch and a touch sensor for detecting an operation of a passenger or a driver of the vehicle;
   an electronic control unit; and
   a driving sensor for detecting the vehicle moving or stopping,
   wherein the touch sensor is disposed on a screen of the display,
   wherein the touch switch corresponding to a predetermined function is disposed on one side of the screen of the display,
   wherein the electronic control unit determines that the predetermined function is allowed to perform when the driving sensor detects the vehicle stopping,
   wherein the electronic control unit determines that the predetermined function is allowed to perform when the electronic control unit determines the operation of the passenger,
   wherein the electronic control unit determines the operation of the passenger when the touch sensor detects a capacitance between the touch sensor and one of a finger and a hand in a case where the touch switch is disposed on a driver's side of the screen, and
   wherein the electronic control unit determines the operation of the driver when the touch sensor detects a capacitance between the touch sensor and one of a finger and a hand in a case where the touch switch is disposed on a passenger's side of the screen.

2. The equipment according to claim 1,
   wherein the display further includes a plurality of touch switches, which correspond to predetermined functions, respectively, and
   wherein the electronic control unit determines that part of the predetermined functions is prohibited to perform when the electronic control unit determines the operation of the driver and the driving sensor detects the vehicle moving.

3. The equipment according to claim 2,
   wherein the touch sensor detects an approach position of a hand or a finger when the driver or the passenger moves the hand or the finger closer to the display, and
   wherein the touch switch detects a touch position of a finger when the driver or the passenger touches the display.

4. The equipment according to claim 3,
   wherein the electronic control unit distinguishes the touch position from the approach position, and distinguishes the approach position of the hand from the approach position of the finger on the basis of a signal from the touch sensor.

5. The equipment according to claim 4,
   wherein the vehicle is a right hand drive vehicle, and the touch switch is disposed on a right side of the display,
   wherein the display is disposed between a passenger seat and a driver seat of the vehicle, and
   wherein the electronic control unit determines the operation of the passenger when the touch sensor detects the approach position of the hand.

6. The equipment according to claim 4,
   wherein the vehicle is a left hand drive vehicle, and the touch switch is disposed on a left side of the display,
   wherein the display is disposed between a passenger seat and a driver seat, and
   wherein the electronic control unit determines the operation of the passenger when the touch sensor detects the approach position of the hand.

7. The equipment according to claim 4, further comprising:
   a plurality of panel switches disposed outside of the display,
   wherein the touch switches are disposed on a periphery of the display, and
   wherein each panel switch corresponds to another predetermined function.

8. The equipment according to claim 4,
   wherein the equipment provides a vehicle navigation system,
   wherein the electronic control unit is a navigation electronic control unit,
   wherein the driving sensor is a parking brake sensor, and
   wherein the display displays at least a map of geography around the vehicle.

9. The equipment according to claim 3,
   wherein the electronic control unit distinguishes the touch position from the approach position on the basis of a signal from the touch sensor,
   wherein the vehicle is a right hand drive vehicle, and the touch switch is disposed on a right side of the display,
   wherein the display is disposed between a passenger seat and a driver seat of the vehicle, and
   wherein the electronic control unit determines the operation of the passenger when the touch sensor detects the approach position moving from a left side to the right side of the display.

10. The equipment according to claim 3,
    wherein the electronic control unit distinguishes the touch position from the approach position on the basis of a signal from the touch sensor,
    wherein the vehicle is a left hand drive vehicle, and the touch switch is disposed on a left side of the display, wherein the display is disposed between a passenger seat and a driver seat of the vehicle, and wherein the electronic control unit determines the operation of the passenger when the touch sensor detects the approach position moving from a right side to the left side of the display.

11. The equipment according to claim 3, wherein the electronic control unit distinguishes the touch position from the approach position on the basis of a signal from the touch sensor, wherein the touch sensor and the touch switch are capable of detecting the approach position and the touch position simultaneously, and wherein the electronic control unit determines the operation of the passenger when the touch sensor and the touch switch simultaneously detect the approach position and the touch position in a case where the touch switch is disposed on a driver's side.

12. The equipment according to claim 11, wherein the electronic control unit distinguishes the approach position of the hand from the approach position of the finger on the basis of the signal from the touch sensor, and wherein the electronic control unit determines the operation of the passenger when the touch sensor and the touch switch simultaneously detect the approach position of the hand and the touch position in a case where the touch switch is disposed on the driver's side.

13. The equipment according to claim 3, wherein the touch sensor includes a thin film and a plurality of current supplies, wherein the thin film is capable of forming a capacitor having a capacitance between the thin film and the hand or the finger in a case where the hand or the finger moves closer to the display or touches the display, wherein the current supplies supply currents to the thin film, and wherein the touch sensor detects the approach position on the basis of the capacitance of the capacitor calculated by the currents.

14. The equipment according to claim 13, wherein the electronic control unit distinguishes the touch position from the approach position on the basis of the currents.

15. The equipment according to claim 14, wherein the electronic control unit distinguishes the approach position of the hand from the approach position of the finger on the basis of the currents.

16. The equipment according to claim 3, wherein the touch sensor includes a plurality of photo acceptance devices and light emitting devices, wherein the light emitting devices emit lights in a direction perpendicular to the display, respectively, and wherein the touch sensor detects the hand or the finger in such a manner that the photo acceptance devices detect reflected lights reflected by the hand or the finger, respectively.

17. The equipment according to claim 16, wherein the electronic control unit distinguishes the touch position from the approach position on the basis of the reflected lights detected by the photo acceptance devices.

18. The equipment according to claim 17, wherein the electronic control unit distinguishes the approach position of the hand from the approach position of the finger on the basis of the reflected lights.

19. Operation equipment for a vehicle comprising:

a display having a touch switch and a touch sensor for detecting an operation of a passenger or a driver of the vehicle;

an electronic control unit; and a driving sensor for detecting the vehicle moving or stopping, wherein the touch sensor is disposed on a screen of the display, wherein the touch switch corresponding to a predetermined function is disposed on the screen of the display, wherein the electronic control unit determines that the predetermined function is allowed to perform when the driving sensor detects the vehicle stopping, wherein the electronic control unit determines that the predetermined function is allowed to perform when the electronic control unit determines the operation of the passenger, wherein the touch sensor detects an approach position of a hand or a finger when the driver or the passenger moves the hand or the finger closer to the display, wherein the touch switch detects a touch position of a finger when the driver or the passenger touches the display, wherein the vehicle is a right hand drive vehicle, and the touch switch is disposed on a right side of the display, wherein the display is disposed between a passenger seat and a driver seat of the vehicle, and wherein the electronic control unit determines the operation of the passenger when the touch sensor detects the approach position of the hand.

20. Operation equipment for a vehicle comprising:

a display having a touch switch and a touch sensor for detecting an operation of a passenger or a driver of the vehicle;

an electronic control unit; and a driving sensor for detecting the vehicle moving or stopping, wherein the touch sensor is disposed on a screen of the display, wherein the touch switch corresponding to a predetermined function is disposed on the screen of the display, wherein the electronic control unit determines that the predetermined function is allowed to perform when the driving sensor detects the vehicle stopping, wherein the electronic control unit determines that the predetermined function is allowed to perform when the electronic control unit determines the operation of the passenger, wherein the touch sensor detects an approach position of a hand or a finger when the driver or the passenger moves the hand or the finger closer to the display, wherein the touch switch detects a touch position of a finger when the driver or the passenger touches the display, wherein the vehicle is a left hand drive vehicle, and the touch switch is disposed on a left side of the display, wherein the display is disposed between a passenger seat and a driver seat, and wherein the electronic control unit determines the operation of the passenger when the touch sensor detects the approach position of the hand.

21. Operation equipment for a vehicle comprising:

a display having a touch switch and a touch sensor for detecting an operation of a passenger or a driver of the vehicle;

an electronic control unit; and a driving sensor for detecting the vehicle moving or stopping, wherein the touch sensor is disposed on a screen of the display, wherein the touch switch corresponding to a predetermined function is disposed on the screen of the display, wherein the electronic control unit determines that the predetermined function is allowed to perform when the driving sensor detects the vehicle stopping, wherein the electronic control unit determines that the predetermined function is allowed to perform when the electronic control unit determines the operation of the passenger, wherein the touch sensor detects an approach position of a hand or a finger when the driver or the passenger moves the hand or the finger closer to the display, wherein the touch switch detects a touch position of a finger when the driver or the passenger touches the display.

wherein the electronic control unit distinguishes the touch position from the approach position on the basis of a signal from the touch sensor, wherein the touch sensor and the touch switch are capable of detecting the approach position and the touch position simultaneously, and wherein the electronic control unit determines the operation of the passenger when the touch sensor and the touch switch simultaneously detect the approach position and the touch position in a case where the touch switch is disposed on a driver's side.

22. The equipment according to claim 21, wherein the electronic control unit distinguishes the approach position of the hand from the approach position of the finger on the basis of the signal from the touch sensor, and wherein the electronic control unit determines the operation of the passenger when the touch sensor and the touch switch simultaneously detect the approach position of the hand and the touch position in a case where the touch switch is disposed on the driver's side.

* * * * *